United States Patent
Kemp, II et al.

(10) Patent No.: US 11,120,501 B2
(45) Date of Patent: *Sep. 14, 2021

(54) METHOD AND SYSTEM FOR INTERNAL MATCHING

(71) Applicant: TRADING TECHNOLOGIES INTERNATIONAL INC., Chicago, IL (US)

(72) Inventors: Gary Allan Kemp, II, Fairfax, CA (US); Jens-Uwe Schluetter, Ridgefield, CT (US); David W. Garrison, Arlington Heights, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/025,540

(22) Filed: Sep. 18, 2020

(65) Prior Publication Data

US 2021/0004903 A1  Jan. 7, 2021

Related U.S. Application Data

(63) Continuation of application No. 10/376,932, filed on Feb. 28, 2003, now Pat. No. 10,817,937.

(51) Int. Cl.
*G06Q 40/04* (2012.01)
*G06Q 30/08* (2012.01)

(52) U.S. Cl.
CPC ............. *G06Q 40/04* (2013.01); *G06Q 30/08* (2013.01)

(58) Field of Classification Search
CPC ........ G06Q 40/04; G06Q 40/00; G06Q 40/06; G06Q 30/08; G06Q 30/02; G06Q 40/10;
(Continued)

(56) References Cited

U.S. PATENT DOCUMENTS 4,674,044 A   6/1987 Kalmus et al.
4,750,135 A   6/1988 Boilen
(Continued)

FOREIGN PATENT DOCUMENTS

EP   0388162 A2   9/1990
EP   1067471 A1   1/2001
(Continued)

OTHER PUBLICATIONS

Minghua He, N. R. Jennings and Ho-Fung Leung, "On agent-mediated electronic commerce," in IEEE Transactions on Knowledge and Data Engineering, vol. 15, No. 4, pp. 985-1003, Jul.-Aug. 2003 (Year: 2003).*

(Continued)

*Primary Examiner* — Gerardo Araque, Jr.

(57) ABSTRACT

A system and method for internal matching of electronic trading orders is provided. Orders for electronic trading are reviewed for potential matches in an internal order book of an internal matching system. If no potential matches are available, the order is listed on both the internal order book for the internal matching system and on the book of orders for the electronic exchange. If a potential match is available, the order is tentatively matched with a resting order on the internal order book. A message is sent to the electronic exchange to cancel the resting order on the book of exchange order book. If the deletion is successful, the order and the resting order are matched. If the deletion is unsuccessful, the internal order book on the internal matching system is checked again for a potential match.

20 Claims, 5 Drawing Sheets

(58) Field of Classification Search
CPC .......... G06Q 20/401; G06Q 30/0627; G06Q 30/0629; G06Q 40/123; G06Q 10/087; G06Q 20/42; G06Q 50/188

See application file for complete search history.

(56) References Cited

U.S. PATENT DOCUMENTS

| | | |
|---|---|---|
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,534,848 A | 7/1996 | Steele et al. |
| 5,689,651 A | 11/1997 | Lozman |
| 5,727,165 A | 3/1998 | Ordish et al. |
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,845,266 A | 12/1998 | Lupien et al. |
| 5,915,245 A | 6/1999 | Patterson, Jr. et al. |
| 5,916,287 A | 6/1999 | Arjomand et al. |
| 5,924,082 A | 7/1999 | Silverman et al. |
| 5,924,083 A | 7/1999 | Silverman et al. |
| 5,946,667 A | 8/1999 | Tull, Jr. et al. |
| 5,953,708 A | 9/1999 | Midorikawa et al. |
| 5,963,923 A | 10/1999 | Garber |
| 6,006,146 A | 12/1999 | Usui et al. |
| 6,012,046 A | 1/2000 | Lupien et al. |
| 6,014,643 A | 1/2000 | Minton |
| 6,035,287 A | 3/2000 | Stallaert et al. |
| 6,098,051 A | 8/2000 | Lupien et al. |
| 6,131,087 A | 10/2000 | Luke et al. |
| 6,134,535 A | 10/2000 | Belzberg |
| 6,195,647 B1 | 2/2001 | Martyn et al. |
| 6,211,649 B1 | 4/2001 | Matsuda |
| 6,272,474 B1 | 8/2001 | Garcia |
| 6,278,982 B1 | 8/2001 | Korhammer et al. |
| 6,282,521 B1 | 8/2001 | Howorka |
| 6,351,828 B1 | 2/2002 | Frimodig et al. |
| 6,377,940 B2 | 4/2002 | Tilfors et al. |
| 6,405,180 B2 | 6/2002 | Tilfors et al. |
| 6,408,282 B1 | 6/2002 | Buist |
| 6,411,998 B1 | 6/2002 | Bryant et al. |
| 7,165,045 B1 * | 1/2007 | Kim-E ............... G06Q 40/00 705/37 |
| 7,792,733 B1 * | 9/2010 | Keith ............... G06Q 40/06 705/37 |
| 2001/0032163 A1 | 10/2001 | Fertik et al. |
| 2002/0023038 A1 | 2/2002 | Fritsch et al. |
| 2002/0026321 A1 | 2/2002 | Faris et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0103741 A1 | 8/2002 | Boies et al. |
| 2002/0107748 A1 | 8/2002 | Boies et al. |
| 2002/0138401 A1 | 9/2002 | Allen et al. |
| 2002/0161687 A1 | 10/2002 | Serkin et al. |
| 2002/0161693 A1 | 10/2002 | Greenwald |
| 2002/0178102 A1 | 11/2002 | Scheinberg et al. |
| 2003/0074253 A1 | 4/2003 | Scheuring et al. |
| 2003/0177086 A1 | 9/2003 | Gomber et al. |

FOREIGN PATENT DOCUMENTS

| | | |
|---|---|---|
| EP | 1321870 A1 | 6/2003 |
| GB | 2366630 A | 3/2002 |
| WO | 1990/10910 A1 | 9/1990 |
| WO | 1990/11571 A1 | 10/1990 |
| WO | 1991/14231 A1 | 9/1991 |
| WO | 1995/06918 A2 | 3/1995 |
| WO | 1995/06918 A3 | 3/1995 |
| WO | 1995/26005 A1 | 9/1995 |
| WO | 1998/49639 A1 | 11/1998 |
| WO | 1999/19821 A1 | 4/1999 |
| WO | 1999/30259 A1 | 6/1999 |
| WO | 2000/11587 A1 | 3/2000 |
| WO | 2000/48113 A1 | 8/2000 |
| WO | 2000/52619 A1 | 9/2000 |
| WO | 2000/62187 A2 | 10/2000 |
| WO | 2000/62187 A3 | 10/2000 |
| WO | 2000/65510 A1 | 11/2000 |
| WO | 2001/04817 A1 | 1/2001 |
| WO | 2001/16830 A1 | 3/2001 |
| WO | 2001/16852 A2 | 3/2001 |
| WO | 2001/22263 A2 | 3/2001 |
| WO | 2001/22263 A3 | 3/2001 |
| WO | 2001/22315 A2 | 3/2001 |
| WO | 2001/88808 A1 | 11/2001 |
| WO | 2002/07032 A1 | 1/2002 |
| WO | 2002/15461 A2 | 2/2002 |
| WO | 2003/071397 A2 | 8/2003 |
| WO | 2003/071397 A3 | 8/2003 |

OTHER PUBLICATIONS

Lee, H., "Electronic brokerage and electronic auction: the impact of IT on market structures," Proceedings of HICSS-29: 29th Hawaii International Conference on System Sciences, Wailea, HI, USA, 1996, pp. 397-406.

Kharouf, J. and Cavaletti, C. "A Trading Room with a View," Futures, vol. 27, Nov. 1998, pp. 66-71.

Myerson, Allen, "Computer Data Services Opening Up," Third Edition, The New York Times, Oct. 12, 1993, retrieved from http://search.proquest.com/docview/305478172?accountid=14753.

USPTO Presentation, NASDAQ, Nov. 8, 2001, 15 pages.

Wallman, S., "Technology takes to securities trading," in IEEE Spectrum, vol. 34, No. 2, pp. 60-65, Feb. 1997, doi: 10.1109/6.570832.

Westland, et al., "Electronic Financial Markets," in Global Electronic Commerce: Theory and Case Studies, MITP, 1999, pp. 385-444.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

Yen, et al., "Intelligent clearinghouse: electronic marketplace with computer-mediated negotiation supports," Proceedings of HICSS-29: 29th Hawaii International Conference on System Sciences, Wailea, HI, USA, 1996, pp. 219-227.

* cited by examiner

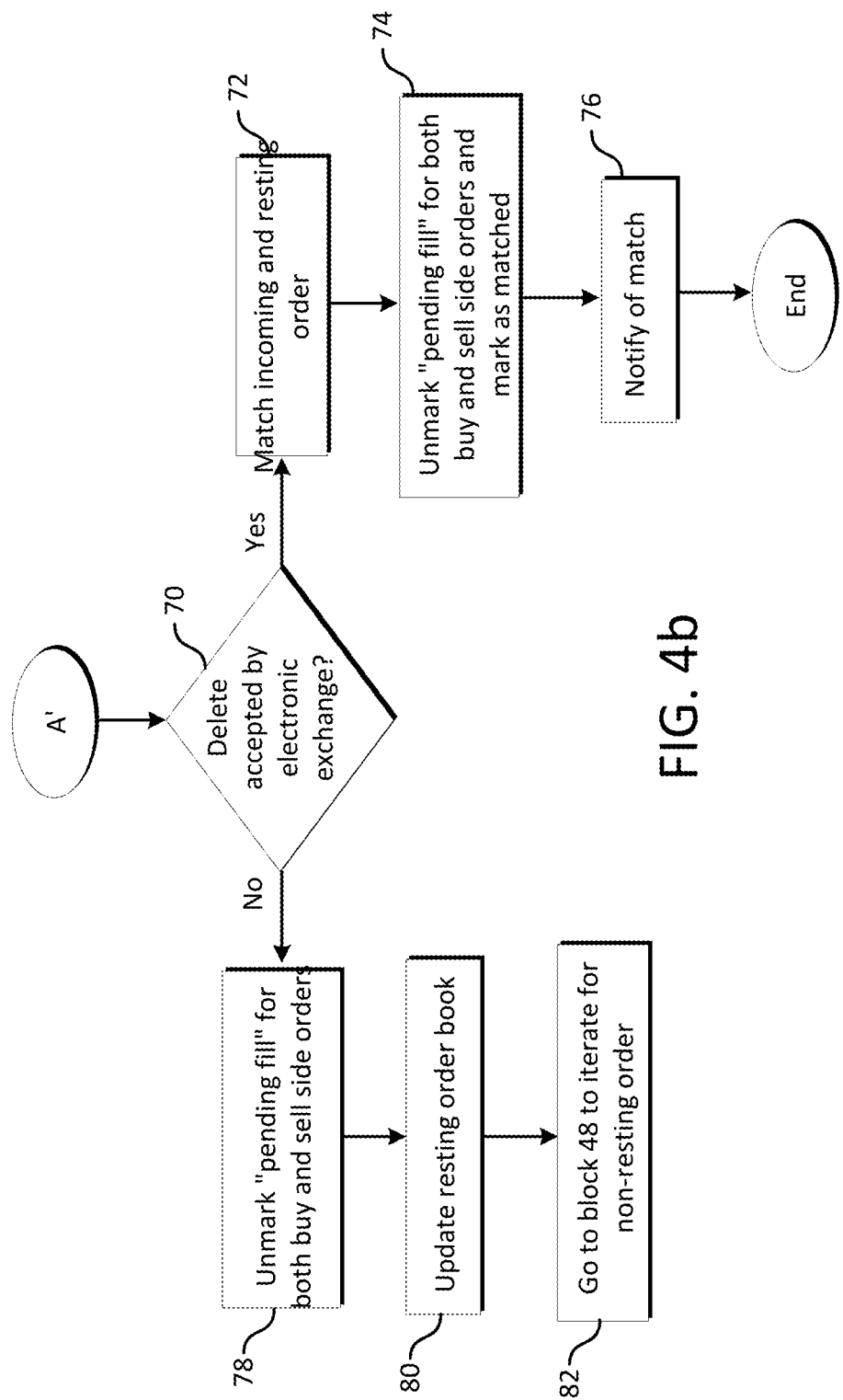

METHOD AND SYSTEM FOR INTERNAL MATCHING

CROSS REFERENCE TO RELATED APPLICATIONS

The present application is a continuation of U.S. patent application Ser. No. 10/376,932, filed Feb. 28, 2003, now U.S. Pat. No. 10,817,937, the entire contents of which are herewith incorporated by reference into the present application for all purposes.

FIELD OF INVENTION

The present invention is directed towards electronic trading. Specifically, the present invention is directed to a versatile and efficient system for matching orders to buy and sell tradeable objects outside of the confines of an exchange.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Typically, electronic trading is based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network represents a group of computers and/or associated devices that are connected by communications medium or facilities. A network can involve permanent connections, such as cables, or temporary connections made through telephone or other communication links. A network can be as small as a LAN (local area network) consisting of a few computers, printers, and/or other devices, or it can consist of many small and large computers distributed over a vast geographic area (WAN or wide area network), or it can consist of both types of networks (both LAN and WAN). For example, the Internet is a well-known collection of networks and gateways that can be used to establish a connection between a client device and the host exchange. In another example, wireless networks that send and receive data via radio, infrared optical signaling, or some other technology that does not require a physical connection can be used. There are many different types of networks, and combinations of network types, known in the art that can link a client device to the host exchange.

Regardless of the type of connection, software running on the client devices allows market participants to log onto one or more exchanges and participate in at least one market. An example of a client device is a personal computer, laptop computer, or a hand-held device. Client devices run software that creates specialized interactive trading screens that enable market participants to obtain market quotes, monitor positions, and submit orders to the host exchange.

Generally, when an order is submitted to a host exchange via a client device, the host checks the conditions associated with the order, for example price and quantity, and prioritizes the order with other orders of the same price. When the order conditions are satisfied in the market, a trade occurs and updated trade information is then relayed in some fashion to one or more client devices. The host exchanges typically publish a data feed to the client devices so that the traders can have access to the most current market information.

Market information commonly includes information regarding the inside market and market depth. The inside market represents the lowest sell price in the market and the highest buy price in the market at a particular point in time. Market depth refers to quantities available at the inside market and may refer to quantities available at other prices away from the inside market. The quantity available at a given price level is usually provided by the host exchange in aggregate sums. In other words, a host exchange usually provides the total buy or the total sell quantity available in the market at a particular price level. The extent of the market depth available to a trader usually depends on the host exchange and/or on network limitations. For instance, some host exchanges provide market depth for all price levels, while some provide only quantities associated with the inside market, and others may provide no market depth at all. Additionally, host exchanges can offer other types of market information such as the last traded price (LTP), the last traded quantity (LTQ), total traded quantity (TTQ), high price, low price, open price, close price, settlement price, and order fill information.

BRIEF DESCRIPTION OF THE DRAWINGS

FIGS. 4a-4b are flow charts of an embodiment of the internal matching system process.

DETAILED DESCRIPTION

I. Overview

Figure 1:
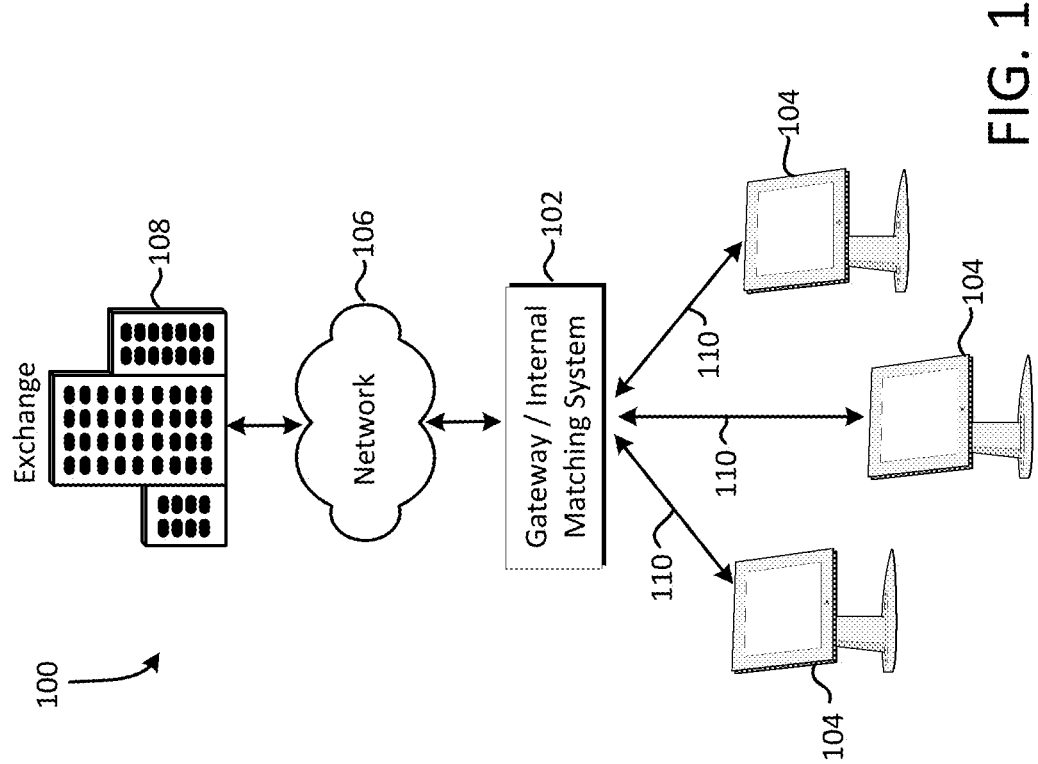
FIG. 1 is a block diagram of one example of an internal matching system integrated with a gateway in an electronic exchange system.

As described with reference to the accompanying Figures, preferred embodiments provide a versatile and efficient system and method for matching orders to buy and sell tradeable objects outside of the confines of an exchange. Matching orders outside of the confines of an exchange is referred to herein as internal matching, which preferably occurs at an internal matching system. The internal matching system may reside locally to a group of one or more traders to provide local order matching or the internal matching system may reside at some remote location to provide order matching for a larger collection of traders.

According to the preferred embodiments, the internal matching system maintains an internal order book that represents buy and sell orders from one or more traders. These buy and sell orders may also be referred to herein as "working orders" or "resting orders." The internal matching system receives buy and sell orders from traders and checks those orders for possible matches with working orders or quantities in the internal order book. When order conditions are satisfied according to any particular matching algorithm, a match at the internal matching system may occur without the need for executing the order at an exchange. If there is not a match in the internal order book the order may be routed to an exchange, where it can be added to the exchange order book. The order may then be working in the internal order book and in the exchange order book, simultaneously. The order or a portion of the order can be matched internally or at the exchange, or the order can be partially filled internally and partially filled at the exchange, whichever provides a better match for the trader and/or whichever occurs first. Once a match occurs, either internally matched or matched at the exchange, the internal matching system automatically performs operations to reflect this change.

Alternatively, an order can be working at the internal matching system until the system is notified that a potential match exists at the exchange. Upon notification, and assuming that the internal working order has not yet been matched at the internal matching system, the order may be forwarded to the exchange for a potential match. To some traders, this alternative approach desirably hides the trader's interest for a longer period of time from those participating in the market at the exchange.

There are many advantages to the preferred embodiments. For instance, the preferred embodiments provide a trader with improved efficiency and versatility in placing, and thus executing, trade orders to buy or sell tradeable objects. The preferred embodiments carefully manage orders so that an order may be matched with quantities in the internal order book, with quantities in the exchange order book, or with quantities in both of the internal order book and the exchange order book (e.g., partially filling both locally and at the exchange). Through effective management, the preferred embodiments attempt to prevent, or eliminate, the possibility of double fills such as filling an order more than once.

Another advantage is that in a FIFO system where orders are prioritized based on time, orders in the internal order book may in effect bypass orders in the exchange order book. This may be true because the number of traders connected to the internal matching system generally comprise a smaller subset of the traders trading in the market listed at the exchange. In such circumstances, given that there are fewer traders connected to the internal matching system, the competition for being first in the order queue at the internal matching system is less severe than the competition for being first in the order queue at the exchange. As a result, a trader's order may have a better chance of being executed at the internal matching system before the market moves away, and the trader's order might be executed faster at the internal matching system. Additionally, transaction fees are reduced or eliminated when orders are matched internally. Moreover, similar benefits may be found using other matching algorithms such as a pro-rata matching algorithm.

Yet another advantage is the time it takes to match an order may be reduced over conventional systems because the preferred embodiment can allow the order to be simultaneously worked in multiple order books, for example, the order may be worked in the internal order book and in the exchange order book, simultaneously. The preferred embodiments support the ability to work orders in multiple order books because they can automatically pull orders from the exchange(s) when an internal match occurs and they can pull orders from the internal order book when a match at an exchange occurs.

Another advantage is that the preferred embodiments provide the ability to match orders at the most optimum price levels for the traders on both sides of a transaction. For instance, the preferred embodiments can be programmed to split the price difference for an internal match so that both traders may benefit. The preferred embodiments may also take into account what it would cost to trade at one or more exchanges and factor that into the matching decision. One skilled in the art of trading would recognize these and other benefits of the preferred embodiments upon reading the description provided herein.

The preferred embodiments may be used to trade any tradeable object. As used herein, that the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

The preferred embodiments will now be described more fully hereinafter with reference to the accompanying drawings, in which preferred and alternative embodiments of the present invention are shown. The preferred embodiments may be embodied in many different forms and should not be construed as limited to the embodiments set forth herein.

II. System Architecture

FIG. 1 shows a block diagram of an example system 100 having an internal matching system integrated with gateway 102. In particular, the system 100 includes one or more client devices 104 connected to at least one gateway 102 which may be connected to exchange 108 over network 106. The system 100, as shown in the Figure, is capable of implementing the preferred embodiment to match orders internally at gateway 102, and the system 100 is also capable of implementing conventional electronic trading to match orders exclusively at exchange 108. Although such a versatile system configuration is not necessary to implement the preferred embodiments, it does give the traders the ability to have their orders only internally matched at gateway 102, either internally matched at gateway 102 or matched at exchange 108, or to have their orders matched exclusively by exchange 108, whichever they prefer.

A. Gateway

Referring to gateway 102, which includes an internal matching system in accordance with the preferred embodiments. Generally, gateway 102 is a device such as a mainframe, super minicomputer, minicomputer, workstation, microcomputer that connects network 106 to network(s) 110 so that market information and transaction information can be successfully passed between client devices 104, the internal matching system at 102, and exchange 108.

The internal matching system at 102 may be implemented at gateway 102 (or some other intermediary computer device) because it is a point at which client devices 104 are interconnected. Additionally, gateway 102 is in communication with exchange 108 over network 106. Then, the system 100 would allow for flexibility to send orders from client devices 104 directly to the internal matching system at gateway 102 or to send orders to exchange 108. Once an order passes through gateway 102, the internal matching system can log the order to an internal order book and/or look for a match with other quantities resting in the internal order book. More detail illustrating a preferred process for internal matching is described with respect to FIGS. 4a-4b.

In an alternative embodiment, the internal matching system may be remote or separate from gateway 102 and still receive orders or order related information. For example, the internal order system could be run on a separate machine in the same building as gateway 102 and connected to gateway 102 over a local area network (LAN), or alternatively, the internal order system could be run on a machine that is placed at a location which is geographically far from gateway 102 and connected to gateway 102 over a wide area network (WAN). It is worth noting that the location of the internal matching system is not significant to the present invention so long as the internal matching system has access to order information to process the orders in a manner such as described in FIGS. 4a-4b. Nonetheless, more example systems are given with respect to FIGS. 2 and 3 to illustrate other example system configurations.

Gateway 102 preferably forwards market information to client devices 104 and receives transaction information from client devices 104 over one or more transmission channels 110 or network(s). Transmission channels 110 might include any type of transmission medium known in the art. Depending on its type, transmission channel 110 can carry information in either analog or digital form. Transmission channel 110 can be a physical link, such as the cable connecting two stations in a network, or it can consist of some electromagnetic transmission, or in optical, microwave, or voice-grade communication. Transmission channels 110 may represent, for example, separate transmission media, or alternatively, transmission channels 110 might represent interconnected transmission media that forms a network such as local area network (LAN). The foregoing examples are provided merely to illustrate the wide variety of communication mediums to which the preferred embodiments may be applied.

Regardless of the communication mediums, gateway 102 receives market information from exchange 108 and converts it to a form compatible with the protocols used by client devices 104 using conversion techniques known in the art. Also, as known by those skilled in the art, gateway 102 may have one or more servers to support the data feeds, such as a price server for processing price information, an order server for processing order information, and a fill server for processing fill information. A trader at one of client devices 104 can subscribe to price information, order information, and fill information for a particular market hosted at exchange 108. Once a client device 104 has subscribed to the information, gateway 102 preferably publishes the market information at a data rate compatible with the connection to the subscribing client devices 104. Gateway 102 also receives transaction information, such as orders, order changes, queries, etc. from client devices 104 and forwards that information to internal matching system at 102 and/or exchange 108.

It should be understood that the inside market at the internal matching system at gateway 102 and the inside market at exchange 108 can be different, depending on which unexecuted orders are working in the internal order book and which unexecuted orders are working in the exchange order book. For instance, the spread between the inside market at the internal matching system might be greater than the spread between the inside market at the exchange. Nonetheless, according to the preferred embodiments, the orders that are represented in the internal order book are also represented at the exchange, therefore, a data feed from the exchange preferably provides market information on all orders. This market information, which describes the internal order book and the exchange order book, may be displayed to the trader(s) on their trading terminals in any particular fashion. Additionally, the market information may be utilized by trading tools to carry out a particular trading strategy.

In alternative embodiment, and if so desired, traders may be given the option to distinguish orders that are resting in the internal order book from orders that are resting in the exchange order book. For instance, a trading terminal may highlight differently orders that are resting in the internal order book from orders that are resting in the exchange order book. Alternatively, multiple windows might be displayed at the trading terminal such that one window shows the internal order book and the other window shows the exchange order book. Of course, these are merely examples and the present invention is not limited to how such information is displayed to the trader.

B. Client Device

Client devices 104 are devices such as a workstation, desktop computer, laptop computer, hand-held device, or any other wired or wireless communication device. According to FIG. 1, client devices 104 connect with gateway 102 over network 110, internal matching system at 102, and with exchange 108 through gateway 102. In the preferred embodiment, client devices 104 use software to create specialized interactive trading screens on terminals associated with them. Trading screens preferably enable traders to, among other things, enter and execute orders, obtain market quotes, and monitor positions. The range and quality of features available to the trader on his or her screens varies according to the specific software application being run. In addition to or in place of the interactive trading screens, a client device 104 may run automated non-interactive types of trading applications.

C. Host Exchange

A connection with exchange 108 may add liquidity to the overall order matching process. Exchange 108 may include, for example, the London International Financial Futures and Options Exchange ("LIFFE"), the Chicago Board of Trade ("CBOT"), the New York Stock Exchange ("NYSE"), the Chicago Mercantile Exchange ("CME"), the Exchange Electronic Trading ("Xetra," a German stock exchange), or the European Exchange ("Eurex"). Exchange 108 might also refer to other known facilities that automatically match incoming orders received from client devices 104.

Figure 2:
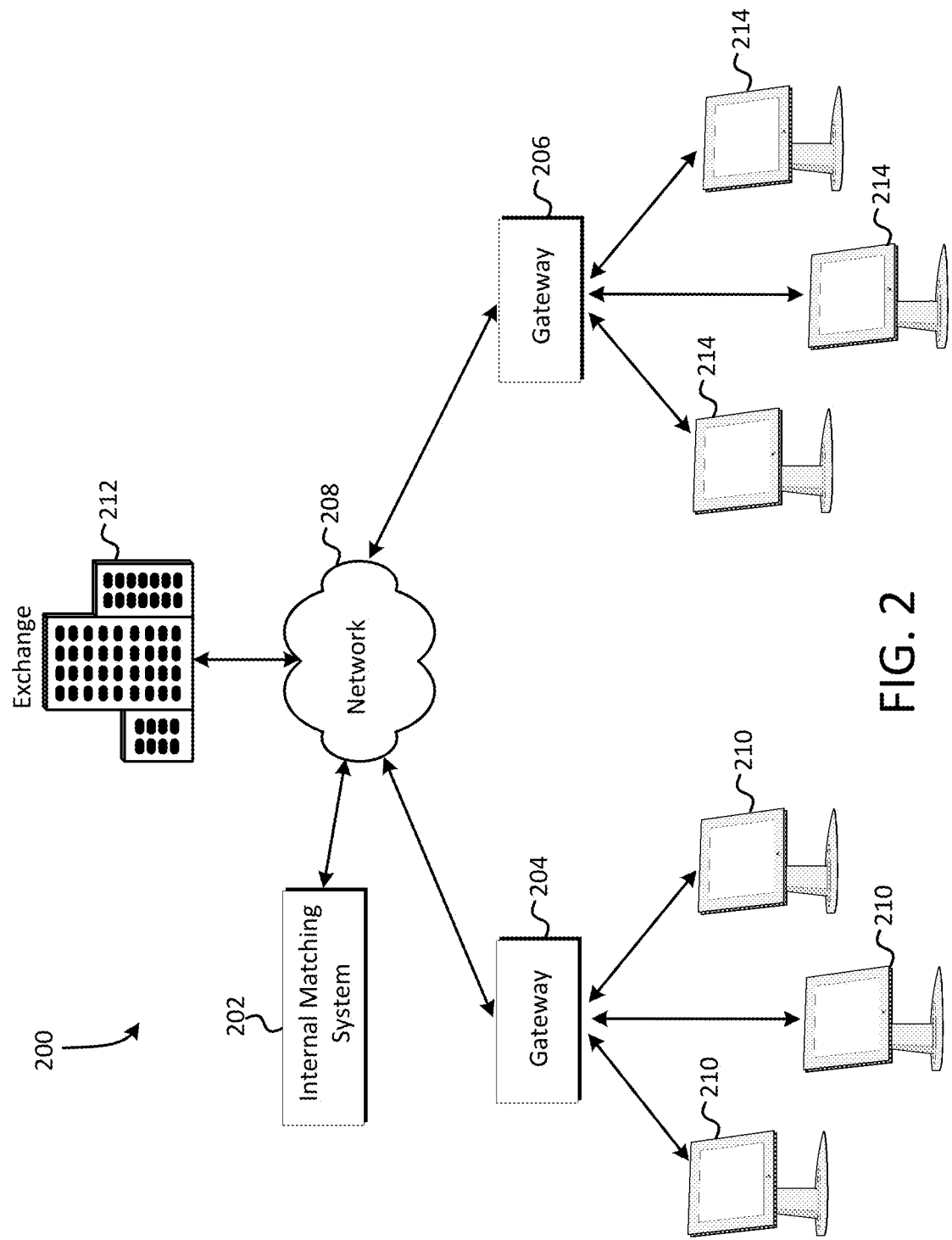
FIG. 2 is a block diagram of another example of an internal matching system in communication with a gateway over a network in an electronic exchange system.

FIG. 2 shows a block diagram of another system 200 having an internal matching system 202 in communication with gateways 204, 206 over network 208. The preferred embodiments allow matching of orders from multiple groups of traders. In this scenario, two groups of traders (e.g., one group is using client devices 210 and another group is using client devices 214) are connected to exchange 212 through two independent gateways 204, 206 over network 208. According to the preferred embodiments, an internal matching system 202 is also connected to network 208 to receive and log orders from client devices 210, 214 to an internal order book at 202. This example system 200 allows for multiple groups of traders, such as multiple satellite trading offices, separate and independent trading companies, and so forth to have orders that can be internally matched outside of the confines of exchange 212. Of course, there can be any number of trading groups which use the internal matching system 202 and the preferred system is not limited to supporting two groups such as shown in the Figure. As described above with respect to FIG. 1, placement of the internal matching system 202 is not of significant importance so long as the internal matching system 202 has access to orders (or information representing those orders) sent from client devices 210 and 214. For instance, the internal matching system could be placed in direct connection with gateways 204, 206 rather than over network 208.

Moreover, it should be understood that it is possible for designated groups to be programmed into an internal matching system so that each group may be restricted from, for example, trading internally with traders in other groups, accessing certain exchanges, accessing certain markets, or trading particular tradeable objects. Then, according to FIG. 2 it may be possible to divide group one using client devices 210 into one or more individual groups or entities. Similarly, group two using client devices 214 may be divided into one or more individual groups or entities.

Figure 3:
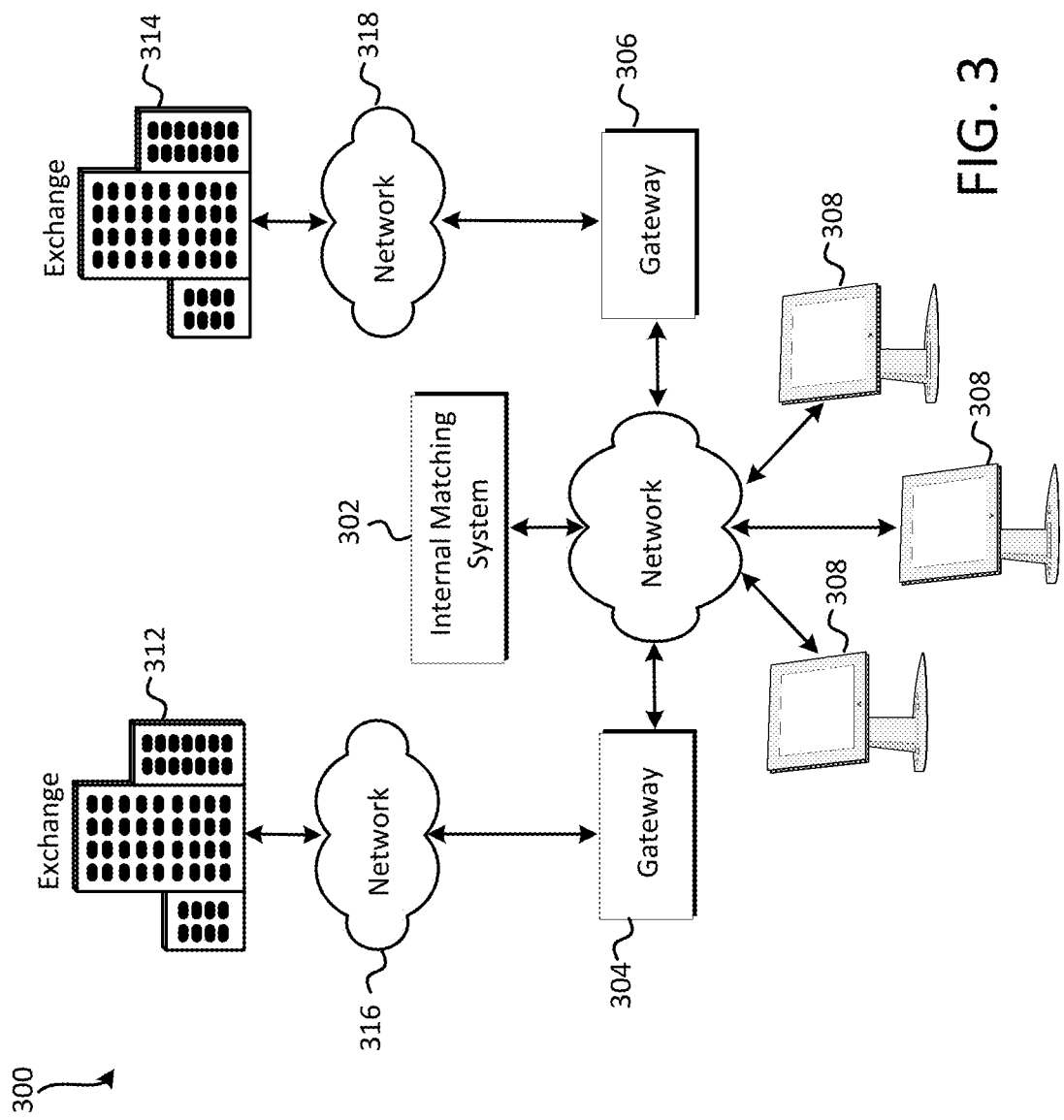
FIG. 3 is a block diagram of yet another example of an internal matching system interacting with a plurality of communication servers or gateways.

FIG. 3 shows a block diagram of yet another example system 300 having an internal matching system 302 in communication with gateways 304, 306 over network 310. This example system 300 illustrates connection of client devices 308 with multiple exchanges 312, 314 and illustrates how the internal matching system 302 can be connected to support such a system 300. If orders were intended for exchange 314, client devices 308 would route their orders to gateway 306 through network 310, in which the internal matching system 302 can receive and log those orders to an internal order book. Similarly, if orders were intended for exchange 312, client devices 308 would route their orders to gateway 304 through network 310, in which the internal matching system 302 can receive and log those orders to the internal order book. Gateways 304, 306 are shown connected with exchange 312, 314 through networks 316, 318, respectively.

If the tradeable objects traded across exchange 312 and exchange 314 are fungible, then the internal matching system could maintain one internal order book which logs orders for exchange 312 and exchange 314 to the same order book. If there is one order book for fungible markets, it might be necessary to normalize the two markets to accommodate any differences such as contract sizes. For instance, a 3:1 ratio or some other ratio may be necessary to maintain the underlying tradeable object size. If the tradeable objects being traded across exchange 312 and exchange 314 are not fungible, then the internal matching system could maintain multiple order books. In other words, each tradeable object could have its own internal order book at the internal matching system 302. Therefore, according to the preferred embodiments, the internal matching system 302 can maintain as many internal order books as necessary.

According to the system in FIG. 3, it is possible to have orders working in the internal order book and at more than one exchange (e.g., exchanges 312, 314). For example, if an order is received at the internal matching system 302, and a match is not found (a process for determining matches is described below), then the internal matching system 302 may forward the order (or a portion thereof) to each exchange 312, 314. Information regarding each order book: the internal order book, exchange 312 order book, and exchange 314 order book may be displayed at a trader's terminal in any fashion. For instance, the market information for all three order books may be combined to form one centralized order book, or they may be kept separately so that the trader(s) can easily distinguish where each order is being worked at. Of course, the preferred embodiments may be implemented with any number of exchanges.

Moreover, consider when one trader (trader A) sends an order to buy a tradeable object at exchange 312 and a second trader (trader B) sends an order to sell a tradeable object at exchange 314. Also assume that the tradeable objects are fungible. Trader A sends a buy order to exchange 312. Trader B sends a sell order to exchange 314. According to the preferred embodiments, it is possible that the internal matching system may match trader A's order with trader B's order, assuming order conditions are satisfied. However, the two tradeable objects may have to be normalized through a ratio to account for any differences (e.g., to account for differences in underlying tradeable object sizes). In such circumstances, the two exchanges 312, 314 could share the same internal order book, or alternatively, the there could be two internal order books (one internal order book for exchange 312 and one internal order book for exchange 314). If there are two order books, then preferably, the system checks with order books that represent fungible tradeable objects.

Sometimes it might be desirable to have a hierarchical configuration where tiers or levels of internal matching systems allow priority matching, for example, for a group, a firm, and multiple firms. According to this embodiment, there could be multiple levels or tiers such that each level has one or more internal matching systems. The internal matching systems could be interconnected in any particular way to provide the desired levels of priority matching. The implementation of such multi-level systems can be understood by breaking the multi-level system down to a basic configuration such as shown in FIG. 1 or FIG. 2. Then, when a match is not found in an internal order book, the order may be routed to another internal matching system (e.g., an internal matching system at a different level) and the process of finding a match occurs at the other internal matching system. The order may also be routed to an exchange in addition to being routed to another internal matching system. The configurations of such systems are endless because it involves interconnecting individual internal matching systems together.

For example, a first level might have three internal matching systems. Each of the three internal matching systems may be designated for a particular group of traders. That is, one group of traders might be assigned to an internal matching system, a second group of traders might be assigned to another internal matching system, and a third group of traders might be assigned to a third internal matching system. Then, an additional layer of internal matching systems can be used to link the first level of systems together. This may link groups one, two, and three together and/or may link groups one, two, and three with even more trading groups. Of course, layers can be added or removed depending on the desired configuration.

III. Matching System Process

Figure 4A:
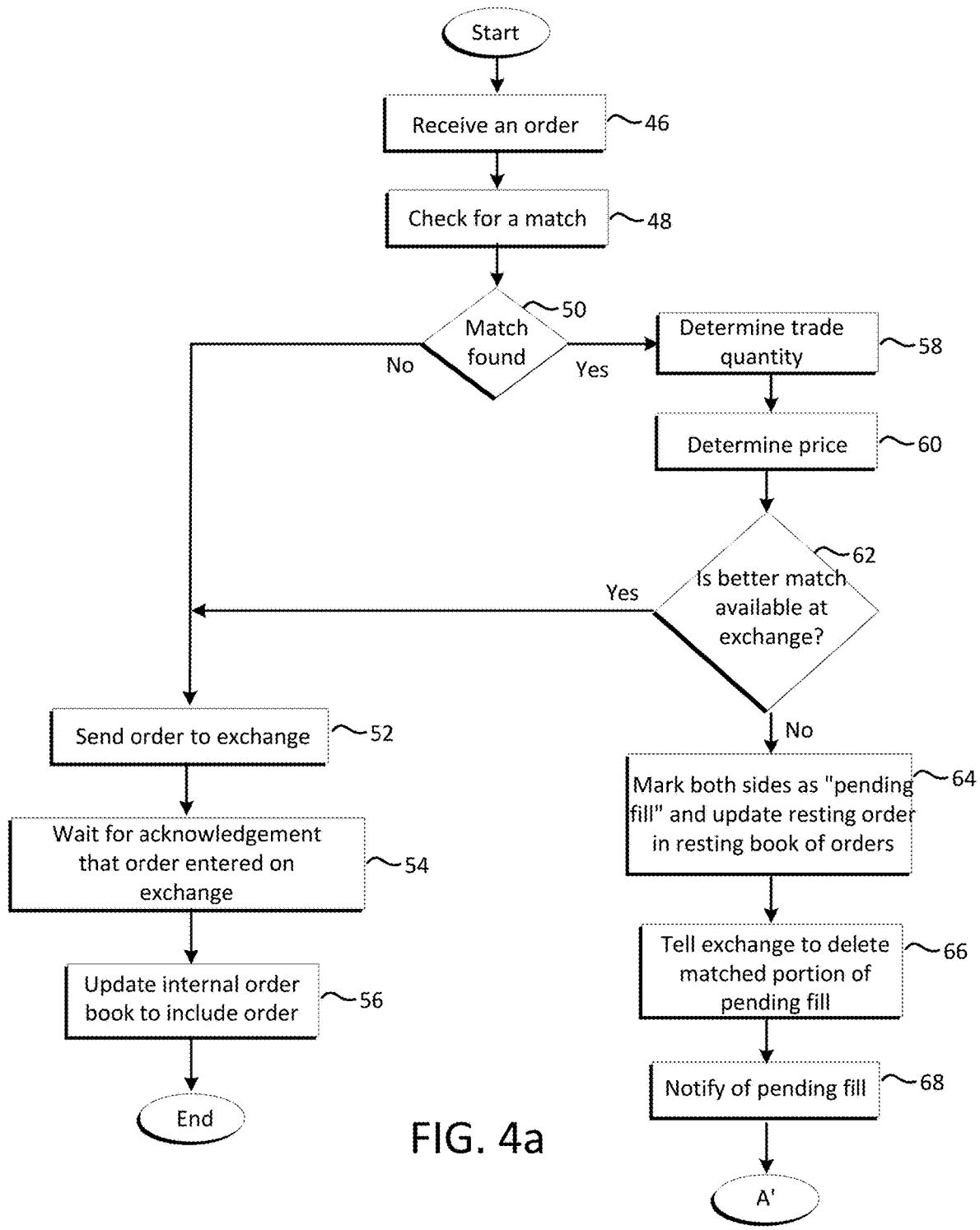

Referring to FIGS. 4a-4b, there is shown a flow chart of a preferred internal matching system process. The internal matching process, such as the process outlined in FIGS. 4a-4b, can be a program or part of a program that is run by an internal matching system such as those described in FIGS. 1-3. The process in FIGS. 4a-4b is described with respect to a system having a configuration similar to that shown in FIG. 1. That is, the described process involves one type of tradable object so that there is one order book at the internal matching system and one order book at the exchange for this particular type of tradeable object. However, upon reading the description herein, one skilled in the art can apply the process to any particular system configuration.

At step 46, an order (e.g., buy or sell order) is received by an internal matching system. Preferably, the order is represented by a unit of information transmitted electronically from a client device. The unit of information can appear as a message that may contain one or more blocks of information. For example, a block of information might identify the message as an order; another block might identify a source address (e.g., a client device), a destination address (e.g., the internal matching system or an exchange), and other such information. In an embodiment, the internal matching system can receive the actual order message. In another embodiment, the internal matching system can receive information or a copy of the order message from another device such as a gateway. Then, according to the latter embodiment, the gateway may receive an order, and send a message to the internal matching system that contains the necessary information to complete the process described herein.

At step 48, the order is checked for a match in an internal order book at the internal matching engine. Recall that the internal order book represents an electronic record of resting buy and sell orders for tradeable objects. The internal order book might perform the step of prioritizing the orders according to price and time priority, although such prioritization usually depends on the type of matching algorithm utilized, more of which is described below. In the preferred embodiments, the internal order book may be maintained by the internal matching system locally. For example, the internal order book may be resident within a memory device of the internal matching system. Alternatively, the internal order book may be maintained at a site separate from the internal matching system and be accessible remotely.

The internal matching system can match orders using any particular type of order execution algorithm. For example, some order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE, for example, splits all orders for the same price. Of course, the present invention is not limited to any particular type of order execution algorithm.

The internal matching system may implement a matching algorithm that is similar to the exchange in which the client devices are currently trading with. Alternatively, the internal matching system may implement a matching algorithm that is different than the algorithm used by the exchange. The price and quantity that is traded generally depends on the type of order execution algorithm used, but will be covered more with respect to steps 58, 60, and 62.

At step 50, the internal matching system determines if a match is found in the internal matching system's internal order book.

At step 52, if a match is not found, the order is sent to one or more exchanges. When an order is sent to the exchange, the exchange typically sends an acknowledgement of the order and an identifier of the order (such as a number which is associated with the order). This number may be used in subsequent communications with the exchange to identify actions to take with respect to the order, such as when a request to delete an order is sent, as discussed subsequently.

According to one embodiment, the order is not entered into the internal order book, as shown at step 56, until after the acknowledgement from the exchange is received, as shown at step 54. In this manner, the identifier of the order may be stored in association with the order in the internal order book. Alternatively, the order can be entered into the internal order book before an acknowledgment from the exchange is received. Then, the identifier of the order can be stored with the identifier when it is received. Further, the internal matching system may receive a message with the identifier from the exchange that a particular order was filled at the exchange. This signifies that the order corresponding with the identifier should be removed from the internal order book in the internal matching system.

At step 58, if a match is found the trade quantity is determined. Trade quantity is directed to the amount of the tradeable object that is matched, such as by shares, lots, etc. (e.g., 100 shares, 1 lot, etc.). In one embodiment, a determination of the trade quantity is made, in which that trade quantity is defined as the lesser quantity of two matched orders. Therefore, it is possible for only a portion of an incoming order to be matched and have the remaining portion of the order to remain in the internal order book and at the exchange order book.

Additionally, the possibility exists where a new incoming order can match with more than a single resting order, in which case the matched quantity of the new order is calculated to include the sum of all partial matches from within the internal order book. For example, if an incoming order seeks to purchase 100 and the resting order book has 2 orders to sell 75 and 50, the logic of internal matching system may determine the trade quantity by dividing the match between the two orders (e.g., 75/25 lots or 50/50 lots).

At step 60, the trade price is determined. In one embodiment, determination of the trade price for an internal match is based on a variety of factors. Examples of factors include the type of order (e.g., market order, best price order, limit order, etc.), the timing of the order (e.g., whether an order is resting or newly entered), etc. A buy market order is an order to buy at the best available bid price in the market and a sell market order is an order to sell at the best available offer price in the market. Additionally, a buy limit order is an order to buy a specified quantity at or below a specified price. This specified price is known as a limit price. A sell limit order is an order to sell a specified quantity at or above a specified price. The price of a match may be determined as follows:

If the incoming order is a buy market order and the contra order is a sell market order, then the match price may be the last traded price (LTP), which is the price level associated with the most recent fill. The preferred embodiments can utilize the LTP from the exchange or the LTP from the internal matching system, or they can use the LTP that is most recent. If the order is a buy market order and the contra order is a sell limit order, then the match price may be equal to the sell limit order price. If the order is a sell market order and the contra order is a buy limit order, then the match price may be the buy order limit price. If the order is a buy limit price order and the contra order is a sell limit price order such that both order prices are equal, then the match price may be the limit price. If the new order is a sell limit order and the contra buy limit order was resting, then the match price may be the buy order limit price. If the new order is a buy limit order and the contra sell limit order was resting, then the match price may be the sell order limit price. It should be understood that these are examples to further illustrate the step of determining the match price, however, other methods for determining the match price known to those skilled in the art may be used.

It should be understood that the steps of determining the trade quantity 58 and determining the trade price 60 might be performed as listed in FIG. 4*a*, or in reverse order. Additionally, steps 58 and 60 may be combined into step 50.

In another embodiment, even if the conditions of the two orders are not satisfied, the two orders (or any portion of the orders) may still be matched by, for example, splitting the difference in price between them. This might be useful in situations where it would be better to match the two orders internally rather than let the exchange match the two orders and then have to pay exchange related transaction fees or other types of fees. For example, if an order to buy was at 65 and an order to sell was at 66, then it might be more beneficial to both sides to match them at 65.5 (or some other fraction) than to let the exchange match them at either 65 or at 66. Therefore, logic in the internal matching system may take factors such as these into consideration when determining if a match is found.

At step 62, it is determined whether a better match is available at one of the exchanges based on the price available from step 60. For example, the internal matching system may be configured to check the inside market of one, some or all available exchanges which trade the particular tradeable object to see if a better match is available at an exchange for a new order as opposed to matching the order (or a portion of the order) to quantities resting in the internal order book at the internal matching system. If so, the order may be routed to the electronic exchange without an internal match, as indicated by the arrow from step 62 to step 52. Step 62 might reduce the likelihood of an order receiving a worse internal match than would be generated by the electronic exchange host. This determination of whether a better price is available may be limited to a specific type of order (such as market orders) or may be applied to any type of order. An example of such a situation is as follows: the inside market in the exchange order book has a resting offer for 10, the internal order book has a resting offer for 11. According to one scenario, a bid for 11 might result in an internal match of 11 even though if it went to the electronic exchange the match would have been for 10. Thus, according to the preferred embodiments, to obtain a better price (e.g., the 10 in the above example), the order may be sent to the exchange for matching.

As previously mentioned, when determining if there is a better match at the exchange, the internal matching system may take into account the fees associated with matching at an exchange rather than matching internally. Recall that sometimes it is better to trade internally for a worse price rather than at the exchange for a better price when considering exchange fees. So, using the example above where there was a match at 11 in the internal order book and a match at 10 in the exchange order book, it might be better to take the match at 11 internally rather than take 10 at the exchange and pay exchange related fees.

At step 64, if there is no better match available at the electronic exchange, the internal matching system may designate both sides of the order (the incoming order and the order in the internal order book or a portion of either) as "pending fill." Designation of the orders as "pending fill" acts as a tentative match and disallows other orders from potentially being matched with either the incoming order or the order in the internal order book. The internal matching system sends a delete message (or some other message which performs a similar type of action) to the electronic exchange(s) to remove the matched portion of the pending fill, as shown at step 66. If the electronic exchange confirms that the order has been deleted, the pending fill is preferably changed to a permanent fill, as discussed subsequently. If the electronic exchange sends a message that the delete request has been rejected, the orders are preferably unmarked as "pending fill." Moreover, if it is a partial fill, then a change or cancel/replace message may be used to adjust the order quantity at the exchange.

At step 70 in FIG. 4*b*, it is determined whether the delete request sent to the electronic exchange has been accepted. If the delete has been accepted, the incoming order and the resting order from the internal order book are matched, as shown at step 72. Both sides are unmarked as "pending fill" and marked as matched, as shown at step 74. In addition, a notification is sent regarding the match, as shown at step 76. Notifications may be shown at different points in the network, such as displayed at client device 38. The notification may take several forms. For example, a fee column in a fill window might be displayed to the trader to signify that there were no fees incurred because of an internal match. This might be shown by displaying "$0.00" in the fee column in the row associated with the specific internal match. On the other hand, a new "internal match" column may be created. As noted previously, fees need not be incurred because with an internal match, the order, or fill of an order, is not officially received by an electronic exchange, and as such is not subject to the electronic exchange's transaction fees.

If the entire trade quantity was not filled at the exchange (e.g., partial fill), an internal match may still be possible for the unfilled portion. The internal order book may be updated to reflect the unfilled portion of the resting order. The process of finding a match for the remaining unfilled portion may be repeated by returning to step 48.

The following examples are provided to illustrate various scenarios. Consider when a trader submits a buy order for a 10 lot, the internal matching system checks the internal order book for sell quantities. If there are sell quantities, the internal matching system checks to determine the trade quantity and price. For example, if there is a 15 lot sell order at a certain price in the internal order book, the trade quantity might be 10 lots (e.g., the minimum quantity of the two orders) and the trade price might be the limit price of the sell order. Then, the internal matching system may determine if the price available at an exchange is less than the potential internal order match price. If so, the 10 lot buy order is sent to the electronic exchange for possible matching. If not, both orders are marked as a "pending fill" and the electronic exchange is sent a message to delete 10 of the 15 lots for the sell side (this is assuming that the 15 lot sell order was also in the exchange order book in addition to being in the internal order book). If the exchange confirms that the delete was successful, the orders may be internally matched and executed and the internal order book is updated.

Alternatively, a delete command to the exchange may fail because the order was deleted by the trader or the order was filled by the exchange, for example. Both orders are unmarked as pending fill, as shown at step 78. The internal order book of the internal matching system may be updated based on the information sent from the exchange regarding the resting order, as shown at step 80. For example, if only a portion of the resting order is available for internal matching (either due to being filled or cancelled), the resting order in the internal order book is updated to reflect that only the portion of the order is now available. Alternatively, if the entire resting order is unavailable, the resting order is deleted from the internal order book.

Using the 10-lot buy and 15-lot sell example directly above, if the delete was unsuccessful, such as if 8 of the 15-lots for the sell order could not be deleted, the internal matching system may delete 7 of the 15-lots from the exchange. Then, 7 of the 10-lot buy order may be matched with the 7 of the 15-lot sell order. The "pending fill" designation for that portion of the orders is removed. The remaining 3 of the 10-lot buy order may rest in the internal order book and in the exchange order book.

Sometimes it might be worthwhile to track and report various statistics regarding the operation of the internal matching system. This feature could be utilized for at least two modes of operation. One mode might include the actual process of internally matching orders such as described with respect to the process outlined in FIGS. 4a-4b. Another mode (e.g., a diagnostic or statistically analysis mode) might include not actually matching orders internally, but reporting on such things as what orders could have matched internally had the system been on and matching, the monetary result of such internal trading, report time deltas between the internal match, and so on. In other words, according to the latter mode, the preferred embodiments are able to identify and report matching without actually making any trades.

IV. Conclusion

The preferred embodiments provide many advantages. For instance, orders can be worked in multiple order books simultaneously. The preferred embodiments may take into account certain factors, such as exchange transaction fees, when determining if to match orders internally. The preferred embodiments can support partial fills such that part of an order can be filled internally and another part of the order can be filled at an exchange. The preferred embodiments may manage orders in multiple order books so that a chance of double filling an order is reduced, if not eliminated. The preferred matching system can be implemented with any type of network configuration and may be used on multiple levels.

Preferred embodiments of the present invention have been described herein. It is to be understood, of course, that changes and modifications may be made in the embodiments without departing from the true scope of the present invention, as defined by the appended claims. The present embodiment preferably includes logic to implement the described methods in software modules as a set of computer executable software instructions. A processor implements the logic that controls the operation of the at least one of the devices in the system, including the host device, one, some or all of the devices in the network, and/or the client devices. The processor executes software that can be programmed by those of skill in the art to provide the described functionality. The software can be represented as a sequence of binary bits maintained on a computer readable medium described above.

It should be understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It should further be understood that a hardware embodiment might take a variety of different forms. The hardware may be implemented as an integrated circuit with custom gate arrays or an application specific integrated circuit ("ASIC"). The embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

What is claimed is:

1. A non-transitory computer readable medium having stored therein instructions executable by a processor of a computing device, including instructions executable to:

receive a first order message from a client device, wherein the first order message specifies a first quantity for a tradeable object at a first price, wherein the tradeable object is available for trading at an electronic exchange, wherein the computing device is in communication with the client device and the electronic exchange;

determine, in response to receiving the first order message from the client device, a matching internal order for the first order message based on the first price and the first quantity, wherein the matching internal order is in an internal order book of the computing device, wherein the matching internal order corresponds to a resting order for the tradeable object in an exchange order book at the electronic exchange, wherein the matching internal order is for a matching internal order quantity;

determine, in response to determining the matching internal order, a trade quantity based on the first quantity and the matching internal order quantity, wherein the trade quantity is the lesser of the first quantity and the matching internal order quantity;

designate, in response to determining the matching internal order, the matching internal order as a pending fill in the internal order book;

send, in response to designating the internal matching order as a pending fill, an order update message to the electronic exchange, wherein the order update message is for the resting order corresponding to the matching internal order, wherein the order update message requests a quantity of the resting order be reduced by the trade quantity;

receive, after sending the order update message to the electronic exchange, a confirmation message for the order update message from the electronic exchange, wherein the confirmation message indicates that the quantity of the resting order was reduced in response to the request in the order update message;

designate, in response to receiving the confirmation message, the matching internal order as matched in the internal order book; and send, in response to designating the matching internal order as matched, a notification message to the client device indicating that the first order message was matched with the matching internal order for the trade quantity.

2. The non-transitory computer readable medium of claim 1, wherein the first order message is for one of: a market order and a limit order.

3. The non-transitory computer readable medium of claim 1, wherein the matching internal order is a plurality of internal orders, wherein each matching internal order corresponds to a resting order in the exchange order book at the electronic exchange, wherein the matching internal order quantity is the sum of the quantities of the plurality of internal orders.

4. The non-transitory computer readable medium of claim 1, further including instructions executable to:
determine a trade price based on the first price and the internal order book, wherein the matching internal order is determined based on the trade price.

5. The non-transitory computer readable medium of claim 1, further including instructions executable to:
determine that a better match for the first order message is not available at the electronic exchange, wherein the matching internal order is designated as a pending fill in response to determining that the better match is not available.

6. The non-transitory computer readable medium of claim 1, wherein the order update message is one of: a delete message and a cancel/replace message.

7. The non-transitory computer readable medium of claim 1, further including instructions executable to:
determine, in response to designating the matching internal order as matched, a second matching internal order for the first order message based on the first price and a remaining quantity, wherein the second matching internal order is in the internal order book, wherein the second matching internal order corresponds to a second resting order for the tradeable object in the exchange order book at the electronic exchange, wherein the second matching internal order is for a second matching internal order quantity, wherein the remaining quantity is the first quantity minus the trade quantity;
determine a second trade quantity based on the remaining quantity and the second matching internal order quantity, wherein the second trade quantity is the lesser of the remaining quantity and the second matching internal order quantity;
designate the second matching internal order as a pending fill in the internal order book;
send a second order update message to the electronic exchange, wherein the second order update message is for the second resting order corresponding to the second matching internal order, wherein the second order update message requests a quantity of the second resting order be reduced by the second trade quantity;
receive a second confirmation message for the second order update message from the electronic exchange, wherein the second confirmation message indicates that the quantity of the second resting order was reduced in response to the request in the second order update message;
designate the second matching internal order as matched in the internal order book; and
send a second notification message to the client device indicating that the first order message was matched with the second matching internal order for the second trade quantity.

8. The non-transitory computer readable medium of claim 1, further including instructions executable to:
receive a second order message from a second client device, wherein the second order message specifies a second quantity for the tradeable object at a second price, wherein the computing device is in communication with the second client device; and
determine a second matching internal order for the second order message based on the second price and the second quantity, wherein determining the second matching internal order ignores the matching internal order after the matching internal order has been designated as a pending fill.

9. The non-transitory computer readable medium of claim 8, wherein the second client device is the first client device.

10. The non-transitory computer readable medium of claim 1, further including instructions executable to:
reduce, in response to designating the matching internal order as matched, a quantity for the matching internal order by the trade quantity; and
designate the matching internal order as available.

11. A system including:
a computing device,
wherein the computing device is configured to receive a first order message from a client device, wherein the first order message specifies a first quantity for a tradeable object at a first price, wherein the tradeable object is available for trading at an electronic exchange, wherein the computing device is in communication with the client device and the electronic exchange;
wherein the computing device is configured to determine, in response to receiving the first order message from the client device, a matching internal order for the first order message based on the first price and the first quantity, wherein the matching internal order is in an internal order book of the computing device, wherein the matching internal order corresponds to a resting order for the tradeable object in an exchange order book at the electronic exchange, wherein the matching internal order is for a matching internal order quantity;
wherein the computing device is configured to determine, in response to determining the matching internal order, a trade quantity based on the first quantity and the matching internal order quantity, wherein the trade quantity is the lesser of the first quantity and the matching internal order quantity;
wherein the computing device is configured to designate, in response to determining the matching internal order, the matching internal order as a pending fill in the internal order book;
wherein the computing device is configured to send, in response to designating the internal matching order as a pending fill, an order update message to the electronic exchange, wherein the order update message is for the resting order corresponding to the matching internal order, wherein the order update message requests a quantity of the resting order be reduced by the trade quantity;
wherein the computing device is configured to receive, after sending the order update message to the electronic exchange, a confirmation message for the order update message from the electronic exchange, wherein the confirmation message indicates that the quantity of the resting order was reduced in response to the request in the order update message;
wherein the computing device is configured to designate, in response to receiving the confirmation message, the matching internal order as matched in the internal order book; and
wherein the computing device is configured to send, in response to designating the matching internal order as matched, a notification message to the client device indicating that the first order message was matched with the matching internal order for the trade quantity.

12. The system of claim 11, wherein the first order message is for one of: a market order and a limit order.

13. The system of claim 11, wherein the matching internal order is a plurality of internal orders, wherein each matching internal order corresponds to a resting order in the exchange order book at the electronic exchange, wherein the matching internal order quantity is the sum of the quantities of the plurality of internal orders.

14. The system of claim 11,
wherein the computing device is configured to determine a trade price based on the first price and the internal order book, wherein the matching internal order is determined based on the trade price.

15. The system of claim 11,
wherein the computing device is configured to determine that a better match for the first order message is not available at the electronic exchange, wherein the matching internal order is designated as a pending fill in response to determining that the better match is not available.

16. The system of claim 11, wherein the order update message is one of: a delete message and a cancel/replace message.

17. The system of claim 11,
wherein the computing device is configured to determine, in response to designating the matching internal order as matched, a second matching internal order for the first order message based on the first price and a remaining quantity, wherein the second matching internal order is in the internal order book, wherein the second matching internal order corresponds to a second resting order for the tradeable object in the exchange order book at the electronic exchange, wherein the second matching internal order is for a second matching internal order quantity, wherein the remaining quantity is the first quantity minus the trade quantity;
wherein the computing device is configured to determine a second trade quantity based on the remaining quantity and the second matching internal order quantity, wherein the second trade quantity is the lesser of the remaining quantity and the second matching internal order quantity;
wherein the computing device is configured to designate the second matching internal order as a pending fill in the internal order book;
wherein the computing device is configured to send a second order update message to the electronic exchange, wherein the second order update message is for the second resting order corresponding to the second matching internal order, wherein the second order update message requests a quantity of the second resting order be reduced by the second trade quantity;
wherein the computing device is configured to receive a second confirmation message for the second order update message from the electronic exchange, wherein the second confirmation message indicates that the quantity of the second resting order was reduced in response to the request in the second order update message;
wherein the computing device is configured to designate the second matching internal order as matched in the internal order book; and
wherein the computing device is configured to send a second notification message to the client device indicating that the first order message was matched with the second matching internal order for the second trade quantity.

18. The system of claim 11,
wherein the computing device is configured to receive a second order message from a second client device, wherein the second order message specifies a second quantity for the tradeable object at a second price, wherein the computing device is in communication with the second client device; and
wherein the computing device is configured to determine a second matching internal order for the second order message based on the second price and the second quantity, wherein determining the second matching internal order ignores the matching internal order after the matching internal order has been designated as a pending fill.

19. The system of claim 18, wherein the second client device is the first client device.

20. The system of claim 11,
wherein the computing device is configured to reduce, in response to designating the matching internal order as matched, a quantity for the matching internal order by the trade quantity; and
wherein the computing device is configured to designate the matching internal order as available.

* * * * *